(12) United States Patent
Heidenreich et al.

(10) Patent No.: US 12,030,010 B2
(45) Date of Patent: Jul. 9, 2024

(54) FILTER CANDLE

(71) Applicant: Pall Corporation, Port Washington, NY (US)

(72) Inventors: Steffen Heidenreich, Stimpfach (DE); Walter Haag, Stimpfach (DE)

(73) Assignee: Pall Corporation, Port Washington, NY (US)

( * ) Notice: Subject to any disclaimer, the term of this patent is extended or adjusted under 35 U.S.C. 154(b) by 265 days.

(21) Appl. No.: 17/335,670

(22) Filed: Jun. 1, 2021

(65) Prior Publication Data

US 2021/0379521 A1  Dec. 9, 2021

(30) Foreign Application Priority Data

Jun. 3, 2020  (EP) .................................. 20 178 005

(51) Int. Cl.
*B01D 46/24* (2006.01)
*B01D 46/60* (2022.01)

(52) U.S. Cl.
CPC ......... *B01D 46/2407* (2013.01); *B01D 46/60* (2022.01); *B01D 2265/06* (2013.01); *B01D 2267/30* (2013.01); *B01D 2271/022* (2013.01)

(58) Field of Classification Search
None
See application file for complete search history.

(56) References Cited

U.S. PATENT DOCUMENTS

| | | | | |
|---|---|---|---|---|
| 2,884,135 A | * | 4/1959 | Nowak | B01D 25/19 |
| | | | | 210/457 |
| 5,223,012 A | * | 6/1993 | Best | B01D 46/2407 |
| | | | | 55/381 |

(Continued)

FOREIGN PATENT DOCUMENTS

| | | | | |
|---|---|---|---|---|
| CN | 101296740 A | * | 10/2008 | ......... B01D 39/2044 |
| DE | 4017071 A | * | 11/1991 | ............. B01D 29/33 |

(Continued)

OTHER PUBLICATIONS

European Patent Office, extended European Search Report in counterpart European Patent Application No. 20 178 005.3 mailed on Sep. 3, 2020.

*Primary Examiner* — Brit E. Anbacht
(74) *Attorney, Agent, or Firm* — Leydig, Voit & Mayer, Ltd.

(57) ABSTRACT

A filter candle is provided, comprising
one or more filter elements shaped as hollow cylinders of porous material, the filter elements having substantially identical inner and outer diameters and are disposed coaxially with each other;
a support element comprising a metal tube disposed within the filter element(s), said metal tube having an outer diameter smaller than the inner diameter of the filter element(s), said metal tube having a wall with a plurality of perforations; and at least two annular sealing disks having an outer diameter equal to or larger than that of the filter element(s) and an inner diameter smaller than that of the filter element(s), wherein first and second terminal sealing disks are disposed at opposite axial end faces of a single filter element or of a plurality of filter elements disposed in line,
wherein the filter elements are compressed between the first and second terminal sealing disks.

18 Claims, 2 Drawing Sheets

(56) References Cited

U.S. PATENT DOCUMENTS

| | | | |
|---|---|---|---|
| 5,766,467 A * | 6/1998 | Rech | B01D 29/15 |
| | | | 55/508 |
| 5,780,126 A * | 7/1998 | Smith | B01D 46/2407 |
| | | | 428/116 |
| 5,783,067 A * | 7/1998 | Belden | B01D 29/54 |
| | | | 210/493.1 |
| 6,468,322 B1 * | 10/2002 | Alvin | B01D 46/62 |
| | | | 55/482 |
| 7,487,875 B2 * | 2/2009 | Zimmerman | B01D 29/52 |
| | | | 210/345 |
| 11,668,677 B2 * | 6/2023 | Mlcak | B64F 5/60 |
| | | | 436/178 |
| 2002/0011440 A1 * | 1/2002 | Quick | B01D 29/111 |
| | | | 210/493.2 |
| 2007/0045173 A1 * | 3/2007 | Zimmerman | B01D 29/52 |
| | | | 210/450 |
| 2014/0014595 A1 * | 1/2014 | Koo | B01D 29/01 |
| | | | 210/791 |
| 2018/0104632 A1 * | 4/2018 | Schmelzle | B01D 46/2411 |
| 2019/0209960 A1 * | 7/2019 | Luchesi De Almeida | |
| | | | B01D 46/2414 |
| 2020/0306694 A1 * | 10/2020 | Andersen | F01N 13/017 |
| 2023/0182060 A1 * | 6/2023 | Brag | B01D 46/0028 |
| | | | 55/527 |

FOREIGN PATENT DOCUMENTS

| | | | | |
|---|---|---|---|---|
| EP | 0 588 525 A1 | | 3/1994 | |
| EP | 0 810 018 B1 | | 9/2004 | |
| EP | 2 698 188 A1 | | 2/2014 | |
| EP | 2 684 592 B1 | | 11/2016 | |
| FR | 888 429 A | | 12/1943 | |
| FR | 2 034 090 A1 | | 12/1970 | |
| GB | 2046614 A | * | 11/1980 | B01D 24/08 |
| JP | 2000514355 A | * | 10/2000 | |
| KR | 20080097951 A | * | 11/2008 | |
| WO | WO 03/055577 A1 | | 7/2003 | |
| WO | WO-2012156789 A1 | * | 11/2012 | B01D 46/002 |
| WO | WO-2014032774 A1 | * | 3/2014 | B01D 46/0024 |
| WO | WO 2019/243807 A1 | | 12/2019 | |

* cited by examiner

FILTER CANDLE

CROSS-REFERENCE TO RELATED APPLICATIONS

This patent application claims the benefit of under USC 119 of European Patent Application No. 20 178 005.3, filed Jun. 3, 2020, which is incorporated by reference.

FIELD OF THE INVENTION

The present invention relates to a filter candle for gaseous fluids, in particular for hot gas filtration. A typical application for such filter candles is the purification of industrial flue gases or exhaust gases by removal of particles.

BACKGROUND OF THE INVENTION

Filter candles for hot gas applications according to the prior art are often based on porous filter elements in the shape of hollow cylinders with one closed end. The gaseous fluid to be purified usually passes through the wall of the filter element from the outside in a substantially radial direction, and exits the filter element through the one axial opening. A plurality of such filter candles can be arranged parallel to each other to form a filtering assembly.

Filter candles of this type can also be operated as blow-back filters, wherein the filter elements are cleaned by a high-pressure gas stream flowing in the opposite direction of the normal filtering process.

The filter candles described above, which are typically made of a ceramic material, are rigid and self-supported. A major drawback, however, is their limited mechanical strength, in particular their limited tensile and bending strength. Consequently, there is a risk of failure of a filter candle if it is subjected to a mechanical stress, which might be the case, for example, when dust bridging between filter candles occurs.

BRIEF SUMMARY OF THE INVENTION

It is an object of the present invention to provide a filter candle with an improved mechanical strength.

This problem is solved by a filter candle according to claim 1.

In the inventive filter candle, a support element is provided within the one or more cylindrical filter elements. This support element comprises a metal tube which has by itself a considerably higher tensile and bending strength than the porous material of the filter element. The gaseous fluid, after passing through the filter element, enters the metal tube through the plurality of perforations, and exits the filter candle through the opening at one end of the tube.

DETAILED DESCRIPTION OF THE INVENTION

In order to provide for an unhindered flow through the complete inner surface area of the one or more filter elements, there is an annular gap between said inner surface and the outer surface of the metal tube. If a force is exerted onto the filter element in a radial direction, the filter element will move and/or bend until it abuts onto the metal tube. In this way, the metal tube supports and stabilizes the filter element and improves the mechanical strength of the filter candle as a whole, in particular its bending strength.

According to the invention, the one or more filter elements are compressed between the first and second terminal sealing disks, taking advantage of the relatively high compression strength of the porous material of the filter elements. However, the compression of the filter element(s) is such that it allows for a radial movement between a filter element and an adjacent terminal sealing disk, until the filter element comes into contact with the metal tube as described above. During this movement, the axial end faces of the filter element(s) have to be covered tightly by the sealing discs.

According to a first preferred embodiment of the invention, the filter candle comprises only one filter element. In this case, only two sealing disks are provided at the two axial end faces of this filter element. The filter element preferably has an axial length of about 0.5 to about 3.0 m, more preferably from about 1.0 to about 2.5 m.

According to a second preferred embodiment of the invention, the filter candle comprises a plurality of filter elements disposed in line. In this case, in addition to the two terminal sealing disks, further internal sealing disks are provided between adjacent filter elements. Such a segmentation of the filter candle provides for further flexibility and resilience against mechanical stress, in particular against a radial force exerted onto the filter candle.

The total axial length of the plurality of filter elements of the second embodiment can be within the same preferred range of the length of the single filter element of the first embodiment. However, a segmentation is particularly preferred for larger lengths, such as from about 1.5 to about 5.0 m. In the second embodiment, the filter candle preferably comprises two to eight filter elements, more preferably three to five filter elements. The filter elements can have the same or different lengths.

The one or more filter elements preferably have an outer diameter of about 30 to about 150 mm, more preferably from about 60 to about 70 mm, and an inner diameter of about 15 to about 120 mm, more preferably from about 40 to about 50 mm. The wall thickness of the hollow cylinder is typically in a range from about 7.5 to about 20 mm.

The radial distance between the filter element(s) and the metal tube is preferably from about 1 to about 5 mm, more preferably from about 3 to about 4 mm. The outer diameter of the annular sealing disks is equal to or larger than the outer diameter of the filter element(s), and the inner diameter of the sealing disks is smaller than the inner diameter of the filter element(s), so as to provide for a full contact of the axial end face of the filter element with the sealing disks, even if the filter element abuts on the metal tube.

It is preferred in the present invention that each sealing disk comprises an annular metal disk, preferably a steel disk, and a gasket provided on one or both sides of the metal disk in contact with a filter element; i.e., the terminal sealing disks will be provided with gaskets on one side and the internal sealing disks will be provided with gaskets on both sides. In this way, a substantially gastight seal between the filter element(s) and the sealing disks is provided, while at the same time allowing a radial movement of the filter element(s) relative to the sealing disks.

Preferably, the gasket used for the sealing disks of the inventive filter candle comprises graphite, metal fibers, a metal mesh, a polymeric material or a combination thereof. These and further suitable gasket materials are already known from the prior art. The selection of a specific gasket material will also be dependent on the intended use of the inventive filter candle and the respective operating conditions. For example, most polymeric gasket materials are limited with regard to their operation temperature.

The gaskets used for the sealing disks preferably have a thickness of about 1 to about 5 mm, preferably from about 1.5 to about 3 mm.

One or more of the sealing disks may comprise a resilient compensating element. In particular, it is preferred if one of the terminal sealing disks comprises a resilient compensating element. In the embodiment of the invention with more than one filter element, it is also preferred if the internal sealing disks comprise a resilient compensating element. Thereby, an axial bending of two adjacent filter elements relative to each other is enabled. The internal sealing disks can comprise such a compensating element in addition to or in place of an annular metal disk.

The one or more filter elements of the inventive filter candle are typically made of a ceramic material, preferably of a material comprising sintered silicon carbide. These ceramic materials, which exhibit a high porosity, are known from the prior art. Furthermore, the filter element(s) can comprise one or more catalytic materials, in particular for removal of nitrogen oxides.

The metal tube acting as the supporting element of the inventive filter candle is preferably a steel tube, more preferably having a wall thickness of about 2 to about 10 mm, in particular of about 3 to about 6 mm. However, the use of other metals or alloys might also be preferable in certain cases, for example if the gaseous fluid to be filtered requires a higher corrosion resistance or chemical resistance of the support element. This applies accordingly to the annular metal disks of the sealing disks.

Typically, the metal tube will have an axial length larger than the total axial length of the filter element(s), wherein a middle section of the metal tube extends within the filter element(s) and two end sections of the metal tube extend outside of the filter element(s). In this case, the perforations in the wall of the metal tube are distributed uniformly over the middle section, wherein the wall of the two end sections is not perforated.

The number and size of the perforations is preferably selected in such a way that the total area of the perforations is large enough to promote the radial flow of the gaseous fluid into the metal tube, but small enough to maintain a sufficient mechanical stability of the metal tube. With regard to the latter requirement, also the wall thickness of the metal tube has to be taken into account.

According to a preferred embodiment of the invention, a first end section of the metal tube extends outside of the filter element(s) and through the first terminal sealing disk, wherein the first terminal sealing disk is fixed to said first end section, preferably by welding or screwing. It is further preferred if the first end section comprises an axial discharge opening for the gaseous fluid.

In the embodiment described above, a second end section of the metal tube can also extend outside of the filter element(s) and through the second terminal sealing disk, wherein the second terminal sealing disk is axially movable relative to the metal tube. It is further preferred if the second end section is closed at its axial end, thereby allowing a discharge of the gaseous fluid only through the first end section.

By providing a first terminal sealing disk being fixed to the metal tube and a second terminal sealing disk being movable relative to the metal tube, the differences in the thermal extension of the metal tube and the porous material of the filter element(s) are taken into account.

Preferably, the one or more filter elements are compressed between the first and second terminal sealing disks by an axial force exerted onto the second terminal sealing disk through a spring element, preferably a high temperature spring, which abuts against the second terminal sealing disk and a flange element fixed to the second end section of the metal tube.

Since the metal tube is preferably closed at the second end section, as explained above, and the gaseous fluid is discharged only through the first end section, a spring cover can preferably be provided to enclose the second end section including the spring element, thereby protecting the spring element from dust etc. from the outside. The spring cover preferably abuts against the second terminal sealing disk.

A plurality of the filter candles of the present invention can preferably be arranged parallel to each other to form a filtering assembly, in particular for hot gas filtration.

The present invention also relates to the use of the inventive filter candle, or of a filtering assembly comprising a plurality of the inventive filter candles, for hot gas filtration, in particular for purification of industrial flue gases or exhaust gases.

BRIEF DESCRIPTION OF THE SEVERAL VIEWS OF THE DRAWINGS

The exemplary embodiments described hereinafter serve to illustrate further details of the invention with reference to the drawings, wherein.

DETAILED DESCRIPTION OF THE DRAWINGS

Figure 1:
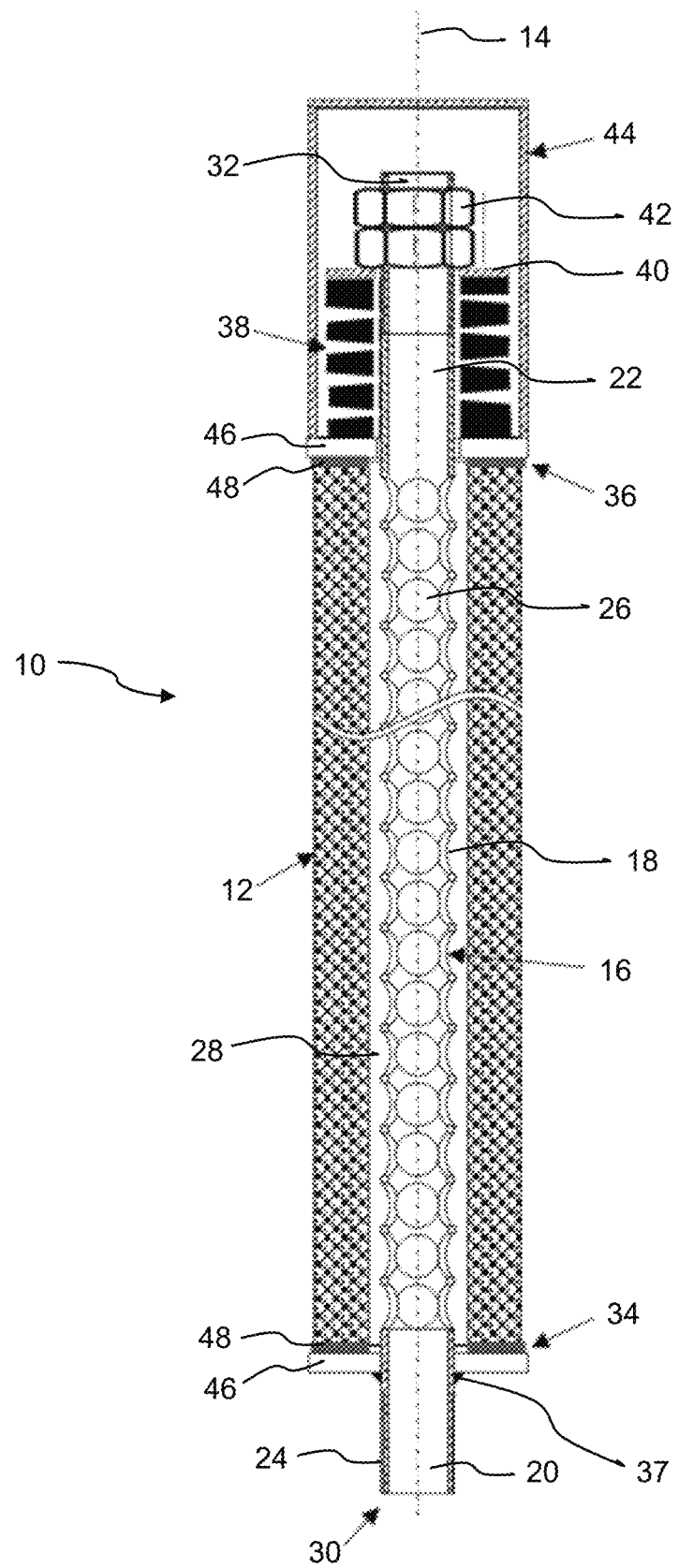
FIG. 1 shows a longitudinal cross section of a first exemplary embodiment of the inventive filter candle.

In FIG. 1, a first exemplary embodiment of the inventive filter candle 10 is shown in a longitudinal cross section. The representation of the filter candle 10 is schematic and not necessarily true to scale.

In this first embodiment, the filter candle 10 comprises one filter element 12 in the shape of a hollow cylinder. The filter element 12 can have, as an example, a length of 1.5 m, an outer diameter of 60 mm and an inner diameter of 40 mm. The filter element 12 is made of a porous material, typically a porous ceramic material. For example, porous filter elements of a sintered silicon carbide material, also known as filter candles, are sold by the applicant under the trademark "Dia-Schumalith".

Inside of the filter element 12, and coaxially extending with the same along a rotational axis 14, is disposed a metal tube 16 (typically a steel tube) as a support element. This metal tube 16 comprises a middle section 18 extending within the filter element 12, as well as first and second end sections 20 and 22 extending outside of the filter element 12. The wall 24 of the metal tube 16 has a plurality of perforations 26 which are distributed uniformly over the middle section 18 of the metal tube 16, whereas the wall 24 in the first and second end sections 20 and 22 is not perforated.

The metal tube 16 can have, for example, an outer diameter of about 34 mm and a thickness of 4 mm of its wall 24. In any case, the outer diameter of the metal tube 16 is smaller than the inner diameter of the filter element 12, resulting in an annular gap 28 between the filter element 12 and the metal tube 16. This gap 28 can have a width of, for example, about 3 mm.

In a typical application of the filter candle 10, for example, for use in hot gas filtration, a gaseous fluid to be filtered passes through the filter element 12 in a substantially radial direction from the outside into the annular gap 28, and through the perforations 26 into the metal tube 16. The gaseous fluid then leaves the metal tube 16 through an axial discharge opening 30 at the first end section 20, whereas the second end section 22 is closed at its axial end 32.

The filter candle 10 further comprises two annular sealing disks, namely a first terminal sealing disk 34 and a second terminal sealing disk 36. The first terminal sealing disk 34 surrounds the first end section 20 of the metal tube 16 and is fixed to the same by welding, as indicated by reference numeral 37, thus providing for a gastight closure of the annular gap 28 at the first end section 20. In contrast, the second terminal sealing disk 36, which surrounds the second end section 22 of the metal tube 16, is axially movable relative to the metal tube 16, to allow different thermal extensions of the metal tube 16 and the filter element 12.

The filter element 12 is compressed between the first and second terminal sealing disks 34 and 36, wherein the compressive force is exerted by a spring element 38, preferable a high temperature spring. This spring element 38 surrounds the second end section 22 of the metal tube 16 and abuts against the second terminal sealing disk 36 and a flange element 40 fixed to the second end section 22, for example by means of screw nuts 42.

The second end section 22 of the metal tube 16 including the spring element 38 is covered by a spring cover 44 which abuts against the second terminal sealing disk 36. The spring cover 44 protects the spring element 38 against dust etc. from the outside, and it also withholds the gaseous fluid which may pass through the small annular gap between the metal tube 16 and the second terminal sealing disk 36.

Each of the terminal sealing disks 34 and 36 comprises a metal disk 46 (typically a steel disk) and a gasket 48. This gasket is in direct contact with the respective axial end face of the filter element 12, providing for a gastight seal, but at the same time allowing a radial movement of the filter element 12. The first terminal sealing disk 34 may additionally comprise a resilient compensating element.

As a result of an external force acting on the filter element 12, the filter element 12 will move radially along the gaskets, until it comes into contact with the metal tube 16. At this point, the metal tube 16 supports and stabilizes the filter element 12, ideally preventing the filter element 12 from bending further and breaking. The metal tube 16 thus acts as a support element which increases the overall tensile and bending strength of the filter candle 10.

In order to provide for a gastight seal at the end faces of the filter element 12 in every position, the outer diameter of the annular sealing disks 34 and 36 is larger than or of the same diameter as the outer diameter of the filter element 12, and the inner diameter of the sealing disks 34 and 36 is smaller than the inner diameter of the filter element 12. In particular, the difference between the outer and inner diameters of the sealing disks 34 and 36 should be at least twice as large as the radial distance between the filter element 12 and the metal tube 16.

Figure 2:
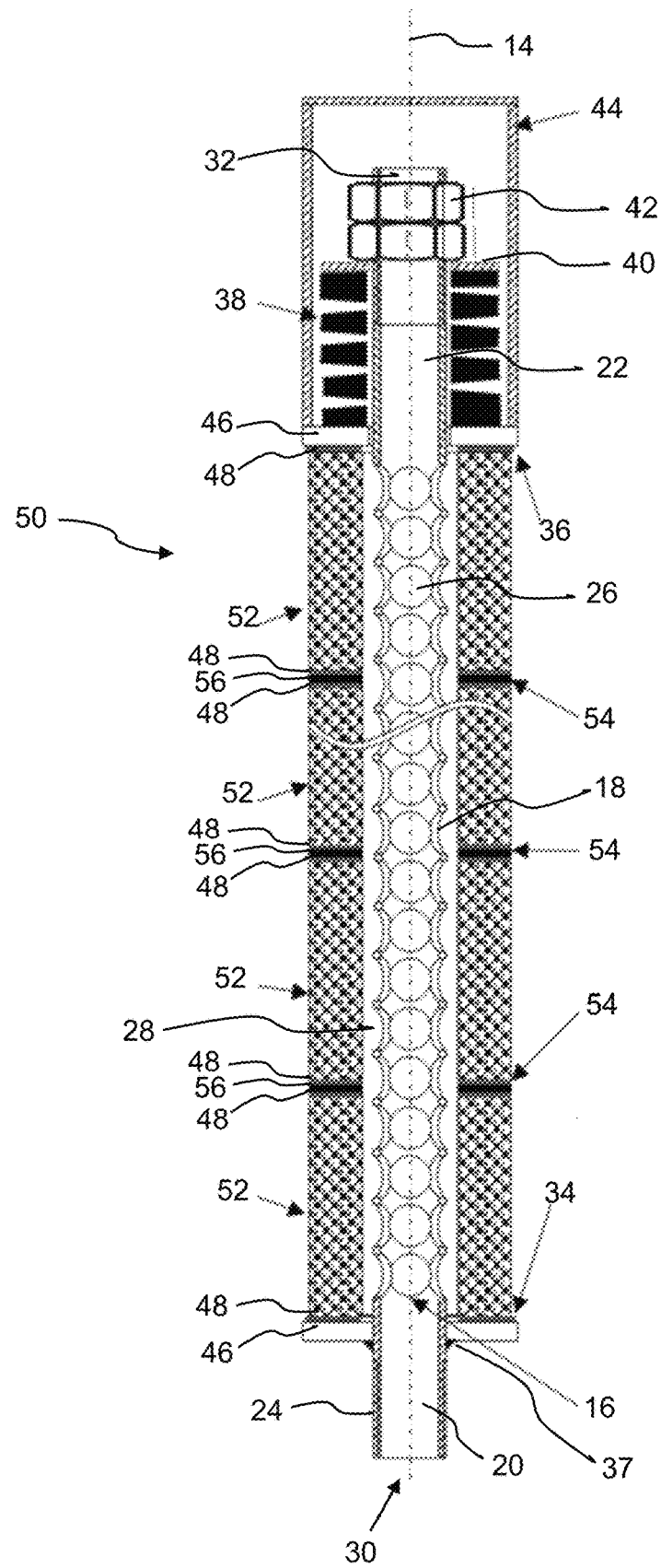
FIG. 2 shows a longitudinal cross section of a second exemplary embodiment of the inventive filter candle.

In FIG. 2, a second exemplary embodiment of the inventive filter candle 50 is shown in a longitudinal cross section. The filter candle 50 of the second embodiment corresponds to the filter candle 10 of the first embodiment except for the differences described below. Identical or corresponding elements in the first and second embodiments are provided with the same reference numerals.

The filter candle 50 of the second embodiment comprises, instead of a single filter element, a plurality of shorter filter elements 52 of a porous material. In this example, four filter elements 52 are shown, but a smaller or larger number of filter elements is also possible. The individual filter elements 52 are shaped as hollow cylinders with identical inner and outer diameters, being disposed coaxially in line along the rotational axis 14 of the filter candle 50.

The length of the individual filter elements 52 can be the same or different, and their total length can be the same as that of the single filter element of the first embodiment (for example, 1.5 m). However, the use of a plurality of filter elements 52 is also particularly advantageous for larger total lengths, such as total lengths of up to 6 m.

Between each two adjacent filter elements 52, an internal annular sealing disk 54 is disposed. The filter elements 52, together with the internal sealing disks 54, are compressed between the first and second terminal sealing disks 36 and 38, as in the filter candle 10 of the first embodiment.

The segmentation into a plurality of filter elements 52 provides for a further flexibility and resilience of the filter candle 50 against mechanical stress, in particular against a radial force exerted onto the filter candle 50. To that effect, the internal sealing disks 54 typically comprise a resilient compensating element 56 which allows an axial bending of the two adjacent filter elements 52 relative to each other. The resilient compensating element 56 is provided with a gasket 58 on both sides.

The following example further illustrates the invention but, of course, should not be construed as in any way limiting its scope.

EXAMPLE

Measurement of Bending Strength

The bending strength of an inventive filter candle in accordance with the first exemplary embodiment was determined in a 4-point bending test. The filter element of the tested filter candle was a hollow cylinder of a ceramic material based on sintered silicon carbide (Dia-Schumalith) with a length of 1.5 m, an outer diameter of 60 mm and an inner diameter of 40 mm.

In the 4-point bending test, the filter element of the inventive filter candle cracked at a force of about 4,800 N.

The corresponding filter element alone, without a supporting metal tube, which is conventionally used as a filtered candle, typically cracks at a bending force in the range from 2,500 to 3,500 N.

Accordingly, the bending strength of the inventive filter candle is increased by about 60% as compared to a corresponding conventional filter candle.

The invention claimed is:

1. A filter candle for gaseous fluids, comprising
one or more filter elements in the shape of hollow cylinders made of a porous material, wherein, if a plurality of filter elements is present, the filter elements have substantially identical inner and outer diameters and are disposed coaxially in line with each other;
a support element comprising a metal tube which is disposed within the one or more filter elements, wherein said metal tube has an outer diameter which is smaller than the inner diameter of the filter element(s), wherein said metal tube has a wall with a plurality of perforations, wherein the metal tube has an axial length larger than the total axial length of the one or more filter elements, and wherein the plurality of perforations are distributed uniformly over a middle section of the metal tubes which extends within the one or more filter elements; and
at least two annular sealing disks having an outer diameter equal to or larger than that of the filter element(s) and an inner diameter smaller than that of the filter element (s), wherein first and second terminal sealing disks are disposed at opposite axial end faces of a single filter element or of a plurality of filter elements disposed in line, wherein a radial distance between the one or more filter elements and the metal tube is from about 1 to about 5 mm, wherein the one or more filter elements are compressed between the first and second terminal sealing disks, and wherein each sealing disk comprises an annular metal disk and a gasket provided on one or both sides of the annular metal disk in contact with a filter element, so as to provide a substantially gastight seal between the filter element(s) and the sealing disks, and to allow a radial movement of the filter element(s) relative to the sealing disk.

2. The filter candle according to claim 1, wherein the filter candle comprises only one filter element.

3. The filter candle according to claim 1, wherein the filter candle comprises a plurality of filter elements disposed in line, wherein further internal sealing disks are disposed between two adjacent filter elements of the plurality of filter elements, and wherein the plurality of filter elements and the internal sealing disks are compressed between the first and second terminal sealing disks.

4. The filter candle according to claim 3, wherein the filter candle comprises two to eight filter elements.

5. The filter candle according to claim 1, wherein the one or more filter elements have an outer diameter of about 30 to about 150 mm.

6. The filter candle according to claim 1, wherein the gasket comprises graphite, metal fibers, a metal mesh, a polymeric material or a combination thereof.

7. The filter candle according to claim 1, wherein one or more of the sealing disks comprise a resilient compensating element.

8. The filter candle according to claim 1, wherein the one or more filter elements are made of a ceramic material.

9. The filter candle according to claim 1, wherein the metal tube is a steel tube.

10. The filter candle according to claim 1, wherein a first end section of the metal tube extends outside of the filter element(s) and through the first terminal sealing disk, and wherein the first terminal sealing disk is fixed to said first end section.

11. The filter candle according to claim 10, wherein a second end section of the metal tube extends outside of the filter element(s) and through the second terminal sealing disk, and wherein the second terminal sealing disk is axially movable relative to the metal tube.

12. The filter candle according to claim 11, wherein the one or more filter elements are compressed between the first and second terminal sealing disks by an axial force exerted onto the second terminal sealing disk through a spring element, which abuts against the second terminal sealing disk and a flange element fixed to the second end portion of the metal tube.

13. The filter candle according to claim 12, wherein the compression of the one or more filter elements is such that it allows for a radial movement between a filter element and an adjacent sealing disk, until the filter element comes into contact with the metal tube.

14. The filter candle of claim 2, wherein the filter element has an axial length of about 0.5 to about 3.0 m.

15. The filter candle of claim 3, wherein the plurality of filter elements have a total axial length of about 0.5 to about 6.0 m.

16. The filter candle of claim 9, wherein the metal tube has a wall thickness of about 2 to about 10 mm.

17. The filter candle of claim 10, wherein the first end section comprises an axial discharge opening for the gaseous fluid.

18. The filter candle of claim 11, wherein the second end section is closed at its axial end.

* * * * *